April 16, 1929.　　　W. WINSLOW　　　1,709,451
WEIGHING APPARATUS FOR THRASHING MACHINES
Filed June 6, 1928
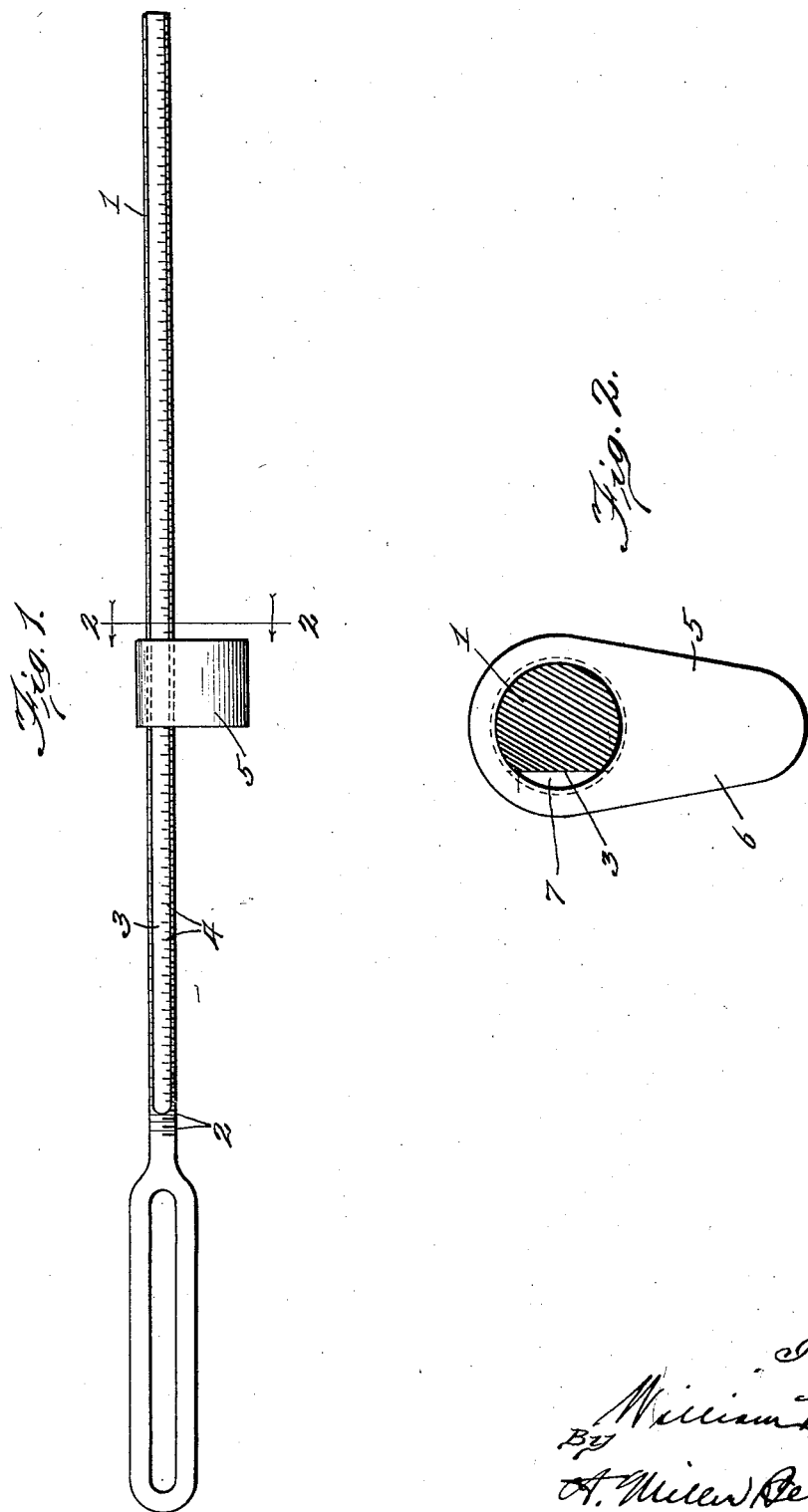

Patented Apr. 16, 1929.

1,709,451

UNITED STATES PATENT OFFICE.

WILLIAM WINSLOW, OF FAIRBURY, ILLINOIS.

WEIGHING APPARATUS FOR THRASHING MACHINES.

Application filed June 6, 1928. Serial No. 283,246.

My invention relates to weighing apparatus, and particularly to weighing apparatus for thrashing machines.

One of the objects of the invention is to provide a simple, practical and advantageous form of weighing machine.

Another object of the invention is to arrange for accurate adjustment of the weighing apparatus so that the weighing of the grain will be accurately done.

In the accompanying drawings:

Fig. 1 is a side elevation of a portion of a weighing machine embodying my invention; and Fig. 2 is a cross section taken on line 2—2 in Fig. 1.

Referring to the drawings, I show a weighing apparatus applied to a thrashing machine, although it will be understood that it can be applied to other types or kinds of machines.

In the drawings, 1 represents a substantially horizontally arranged bar or beam which will be called the weighing bar or beam. This may be suitably mounted in a thrashing machine so as to counterbalance and weigh the grain.

This bar or beam 1 is preferably threaded, as shown at 2, and preferably has a flat side 3 which may be provided with graduations 4 to indicate weight, as, for example, pounds and fractions of pounds.

Upon the bar 3 is mounted a weight 5, which preferably has an eccentric arrangement such as shown, for example, in Fig. 2. In this arrangement the aperture or socket for the bar 1 is located off center, a substantial portion 6 of the weight being at one side of the bar socket 7 so that the weight 5 will always tend to remain in a vertical position, as shown in Fig. 2. If the weight is left in any other position it will swing down to the position shown, and furthermore will always remain in that position even though there may be a substantial amount of vibration in the apparatus due to the action of the thrashing machine.

Thus, in operation, the weight 5 may be turned upon the bar 1 so as to adjust it along the bar and this adjustment may be made until the weight of the grain is accurately balanced and such weight accordingly indicated by the graduations 4 on the flat surface 3. Thus, the grain may be weighed and the weighing will be accurate and will not be disturbed by the vibratory action of the thrashing machine.

It will be understood that changes and modifications may be made without departing from the spirit of the invention.

What I claim is:

1. A weighing attachment comprising a threaded weighing beam having one side provided with graduations, and an eccentrically mounted weight having threaded connection with said beam.

2. A weighing attachment comprising a threaded weighing beam having a flat side provided with graduations, and a weight having a threaded connection with the beam and being eccentrically mounted thereon.

In witness whereof, I hereunto subscribe my name this 4th day of June, A. D., 1928.

WILLIAM WINSLOW.